US011529767B2

(12) United States Patent
Calmes et al.

(10) Patent No.: US 11,529,767 B2
(45) Date of Patent: *Dec. 20, 2022

(54) METHOD AND APPARATUS FOR CONTROLLING AIR TEMPERATURE FOR MAKING SEALS

(71) Applicant: CMD Corporation, Appleton, WI (US)

(72) Inventors: Casey J. Calmes, Neenah, WI (US); Thomas C. Jansen, Appleton, WI (US); Paul A. Johnson, Menasha, WI (US); Scott A. Beinema, Little Chute, WI (US); Timothy J. Rymer, Neenah, WI (US); Michael J. Stickney, Appleton, WI (US)

(73) Assignee: CMD Corporation, Appleton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/197,471

(22) Filed: Mar. 10, 2021

(65) Prior Publication Data

US 2021/0197496 A1  Jul. 1, 2021

Related U.S. Application Data

(63) Continuation of application No. 16/394,185, filed on Apr. 25, 2019, now Pat. No. 10,981,338.

(Continued)

(51) Int. Cl.
*B29C 65/00* (2006.01)
*B29C 65/10* (2006.01)
*B29L 31/00* (2006.01)

(52) U.S. Cl.
CPC .......... *B29C 66/8511* (2013.01); *B29C 65/10* (2013.01); *B29C 66/91231* (2013.01); *B29C 66/91421* (2013.01); *B29L 2031/7128* (2013.01)

(58) Field of Classification Search
CPC ................. B29C 65/10; B29C 66/8511; B29C 66/91231; B29C 66/9121; B29C 66/9141;
(Continued)

(56) References Cited

U.S. PATENT DOCUMENTS 4,850,944 A    7/1989  Osborn
4,976,811 A *  12/1990  Siebert .................... B29C 65/10
                                                          156/497

(Continued)

FOREIGN PATENT DOCUMENTS

DE        202005013722        12/2005

OTHER PUBLICATIONS

Written Opinion of the International Searching authority issued in co-pending PCT application PCT/US2019/029331.

*Primary Examiner* — George R Koch
(74) *Attorney, Agent, or Firm* — Andrus Intellectual Property Law, LLP

(57) ABSTRACT

A method and apparatus for making bags from a film that follows a film path through a bag machine includes an input section located on the film path, a sealing section located on the film path downstream of the input section, an output section located on the film path downstream of the sealing section, and a controller, connected to control the sealing section. The sealing section includes a sealer that includes a heater block and a manifold. There is an air flow path from the heater block to the manifold. Air is heated in the heater block in response to a control signal provided by the controller to the heater block. The heated air is provided through the air path to the manifold. A temperature sensor is disposed in at least one of the air path and the manifold.

15 Claims, 6 Drawing Sheets

Related U.S. Application Data

(60) Provisional application No. 62/665,444, filed on May 1, 2018.

(58) Field of Classification Search
CPC .......... B29C 66/91421; B29C 66/9161; B29C 66/961; B29L 2031/7128
See application file for complete search history.

(56) References Cited

U.S. PATENT DOCUMENTS

| | | |
|---|---|---|
| 5,660,669 A | 8/1997 | Mittleider |
| 7,445,590 B2 | 11/2008 | Selle et al. |
| 7,578,779 B2 | 8/2009 | Selle |
| 7,811,219 B2 | 10/2010 | Sauder et al. |
| 8,012,076 B2 | 9/2011 | Selle et al. |
| 8,029,428 B2 | 10/2011 | Selle et al. |
| 8,257,236 B2 | 9/2012 | Selle et al. |
| 8,998,787 B2 | 4/2015 | Selle et al. |
| 9,238,343 B2 | 1/2016 | Selle et al. |
| 9,434,106 B2 | 9/2016 | Selle et al. |
| 9,751,273 B2 | 9/2017 | Selle et al. |
| 10,981,338 B2 * | 4/2021 | Calmes .............. B29C 66/83511 |
| 2001/0039997 A1 * | 11/2001 | Zeuschner ............ B29C 66/849 |
| | | 156/203 |
| 2002/0174626 A1 | 11/2002 | Lancaster, III et al. |
| 2008/0300121 A1 | 12/2008 | Selle |
| 2021/0197495 A1 * | 7/2021 | Calmes ............... B29C 66/8511 |

\* cited by examiner

METHOD AND APPARATUS FOR CONTROLLING AIR TEMPERATURE FOR MAKING SEALS

CROSS REFERENCE TO RELATED APPLICATIONS

This present disclosure is a continuation of, and claims the benefit of the filing date of, U.S. patent application Ser. No. 16/394,185 filed on Apr. 25, 2019, now U.S. Pat. No. 10,981,338 B2; which claims the benefit of U.S. Provisional Patent Application No. 62/665,444 filed May 1, 2018. The disclosures of these Applications are incorporated herein by reference.

FIELD

The present disclosure relates generally to the art of bag making. More specifically, it relates to using hot air to make seals used to form bags.

BACKGROUND

There are many prior art bag making machines. Generally, bag making machines seal one or more layers of film to form the bags. Often times the seals are made use a seal bar that receives hot air in the seal bar. The hot air raises the temperature of the seal bar so that it can melt the film to form the seal One style of bag machine is a rotary drum bag machine, which typically has an input section, a sealing section and an output section. A controller controls the bag machine. Input section, as used herein, refers to the portion of a bag machine where the web is received and/or provided to the sealing section, such as an unwind and a dancer assembly. Sealing section, as used herein, refers to the section of the machine where the seals are formed. Output section, as used herein, includes assemblies that act on a web downstream of the seals being formed, such as perforators, winders, folders, etc. Controller, as used herein, refers to hardware and/or software that controls one or more aspects of a bag machine in response to user inputs and/or feedback, and may be located in one place, or distributed over several locations.

One commercially successful prior art bag machine is the CMD™ 1270 Global Drawtape System™. Descriptions of that prior art, and similar prior art, may be found in: U.S. Pat. No. 9,751,273 entitled Method and apparatus for making bags, issued Sep. 5, 2017; U.S. Pat. No. 9,434,106 entitled Method and apparatus for making skirtless seal, issued Sep. 6, 2016; U.S. Pat. No. 9,238,343 entitled Method and apparatus for making bags, issued Jan. 19, 2016; U.S. Pat. No. 8,998,787 entitled Method and apparatus for a bag machine, issued Apr. 7, 2015; U.S. Pat. No. 8,257,236 entitled Method and apparatus for making bags, issued Sep. 4, 2012; U.S. Pat. No. 8,029,428 entitled Method and apparatus for making skirtless seals, issued Oct. 4, 2011; U.S. Pat. No. 8,012,076 entitled Method and apparatus for making bags, issued Sep. 6, 2011; U.S. Pat. No. 7,811,219 entitled Method and apparatus for making bags, issued Oct. 12, 2010; U.S. Pat. No. 7,578,779 entitled Bag machine and winder, issued Aug. 25, 2009; U.S. Pat. No. 7,445,590 entitled Method and apparatus for making bags, issued Nov. 4, 2008, each of which is hereby incorporated by reference. The disclosure below will be described in the context of this prior art, although the invention may be implemented in other bag making machines and using other methods.

FIG. 1 shows a typical prior art bag machine. A detailed description of the operation of rotary bag machines may be found in the patents referenced above, but their general operation may be seen with respect to FIG. 1. A rotary bag machine 100 continuously processes a web or film 201 using a dancer assembly 203, a pair of drum-in rolls 205 and 206 (203-206 are part of an input section), a sealing section including sealing drum 208, a pair of drum-out rolls 210 and 211, a sealing blanket 213, a pair of knife-in rolls 215 and 216, a knife 218 (which could be any other web processing device such as a perforator, knife, die cutter, punching station, or folding station), a pair of knife-out rolls 219 and 220 (210-220 are part of an output section), and a controller 221.

The web is provided through dancer assembly 203 to drum 208. Drum 208 includes a plurality of seal bars 209. The seals bars are heated and create the seals forming the bags from web 201. Web 201 is held against drum 208 (and the seals bars) by a Teflon® coated blanket. The distance between seals created by the drum is related to the bag length (for bags formed end to end) or the bag width (for bags formed by making side seals). End to end bags are formed with one seal from the drum, and side to side bags are formed with a pair of seals. The drum diameter may be adjusted and/or less than all of the seal bars turned on to determine the distance between seals, and hence bag size.

The machine of FIG. 1 provides that after web 201 leaves drum 208 it is directed to rotary knife 218, which creates a perforation between bags, or could separate adjoining bags. Some bag machines create the perforation when the seal is being created, instead of using rotary knife 218.

Controller 221 is connected to the various components to control speed position, etc.

Bag machines with air heated seal bars typically have a plenum or heater block that provides heated air to a manifold in the seal bar. The heated air either heats the seal bar which heats the film, or the heated air is directed through openings in the seal bar toward the film to directly heat the film. Seals are formed more consistently when the heated air is maintained at a desired temperature. Prior art bag machines typically have a controller that receives feedback of the temperature of the air in the heater. That feedback is used to regulate the heating of the air. However, the temperature of the air that is delivered to the film, rather than in the heater, should be maintained at a desired temperature to consistently form seals.

FIG. 2 is a diagram of a prior art seal bar and related components. A source of compressed air provides air through a pressure regulator 202 to a pair of heater blocks 206 and 210. A pair of thermocouples 208 and 212 in heater blocks 206 and 210 provide thermal feedback to a controller comprised of modules 207 and 211. Controller 221, 207 and 211 can be considered parts of a single controller, or can be considered individual controllers. The heated air is provided through restrictions to a manifold 214. The placement of thermocouples 208 and 212 in the heater blocks means that the control is based on heater block air temperature, not manifold air temperature. Thus, any temperature differences between the heater blocks and manifold results in inaccurate control.

The plenum or heater block and manifold/bar in prior art bag machines typically are not insulated. This results in heat loss which reduces efficiency and requires more time to bring the seal bar up to temperature when starting the machine. For example, a startup time of 40 minutes is typical. Heat loss also exacerbates the problems caused by sensing heater block air temperature, rather than manifold air temperature.

The air in the manifold is directed to the film as indicated by the arrows, and the film is located under the arrows. The smaller center arrows indicate less air flow in the center of the manifold. Prior art bag machines with air heated seal bars typically do not deliver the same air flow to all portions of the seal bar. However, seals could be better formed if the air flow to different portions of the bar was evenly distributed or controlled in a desired manner.

Accordingly, a bag machine that regulates the temperature of air in or near the seal bar and/or manifold is desired. Preferably the bag machine provides a reduced start-up time. Preferably air flow is provided evenly to different portions of the seal bar, or a desired airflow profile is provided.

SUMMARY

According to a first aspect of the disclosure a bag machine for forming bags from a film that follows a film path through the machine includes an input section located on the film path, a sealing section located on the film path downstream of the input section, an output section located on the film path downstream of the sealing section, and a controller, connected to control the sealing section. The sealing section includes a sealer that includes a heater block and a manifold. There is an air flow path from the heater block to the manifold. Air is heated in the heater block in response to a control signal provided by the controller to the heater block. The heated air is provided through the air path to the manifold. A temperature sensor is disposed in at least one of the air path and the manifold.

According to a second aspect of the disclosure a method of forming bags from a film that follows a film path includes directing the film to an input section, and directing the film from the input section to a sealing section. Air is heated in a heating block and the heated air is directed to a manifold. The temperature of the heated air is in the manifold is measured, and/or the temperature of the heated air as it is being directed to the manifold is measured. The heating of the air in the heating block is controlled in response to measuring the temperature. The manifold is used to form at least one seal and the sealed film is directed to an output section.

The sealer is a hem sealer and/or a pocket sealer, and/or a bottom sealer in various alternatives.

The bag machine includes a feedback circuit connected to the temperature sensor and to the controller, and the feedback sensor provides a signal indicative of temperature near the sensor to the controller in another alternative.

The temperature sensor is located in the manifold in one embodiment.

The temperature sensor is a thermocouple in various embodiments.

The sealing section includes a second temperature sensor located in or near the heater block, and a second feedback circuit is connected to the second temperature sensor and to the controller, and the second feedback sensor provides a signal indicative of temperature near the second sensor to the controller in one alternative.

The sealing section includes a rotary drum disposed along the film path such that the film travels around a portion of the rotary drum in another alternative.

The sealer includes a seal bar on the rotary drum in one embodiment.

The heater block and/or the manifold are insulated in various embodiments.

The manifold includes a first end portion near a first edge of the film path, a second end portion near a second edge of the film path, and a middle portion between the first end portion and the second end portion, and the manifold include an air flow restriction located in the middle portion in another alternative.

Other principal features and advantages of will become apparent to those skilled in the art upon review of the following drawings, the detailed description and the appended claims.

Figure 1:
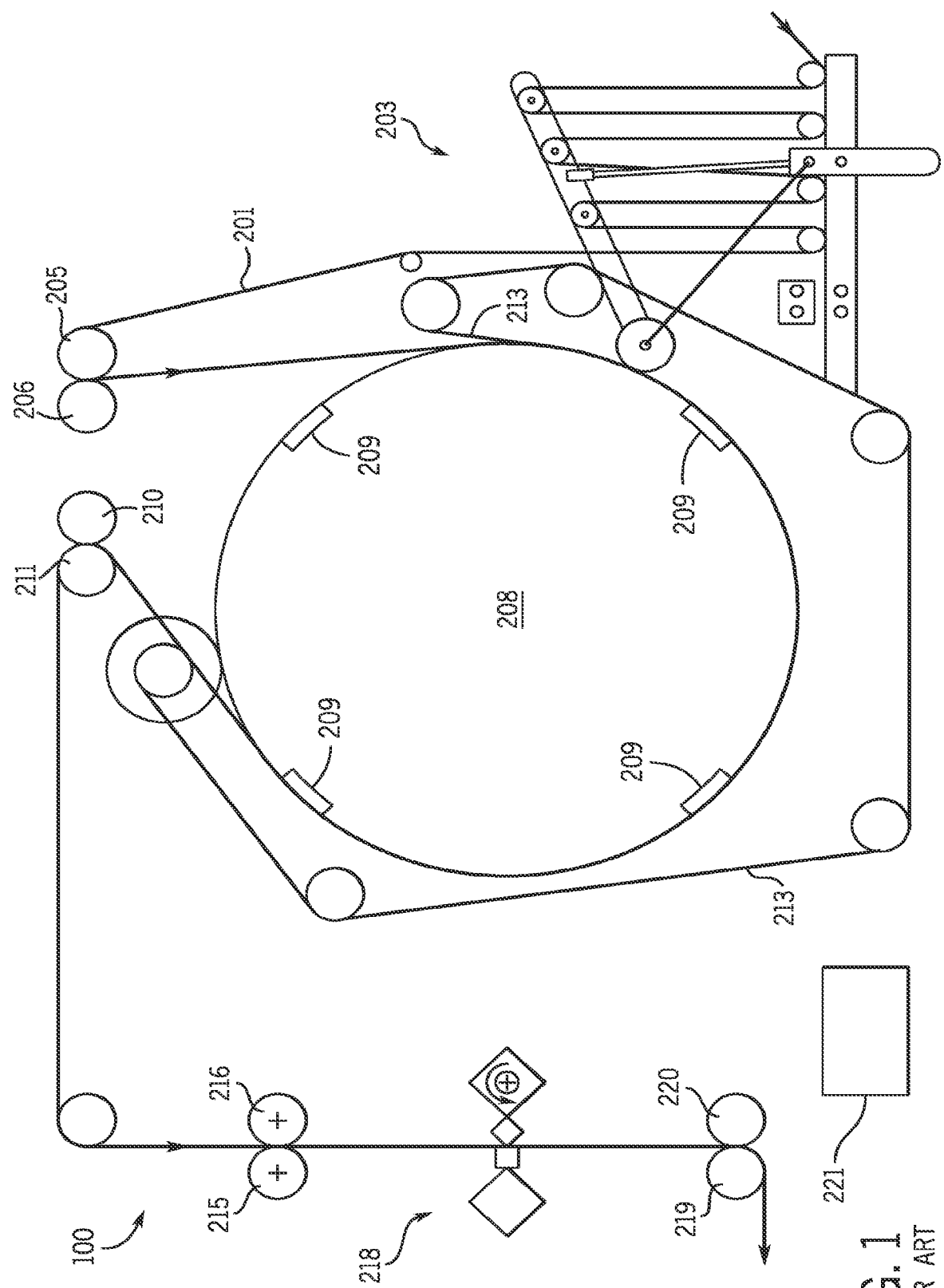
FIG. 1 is diagram of a bag machine.
Figure 2:
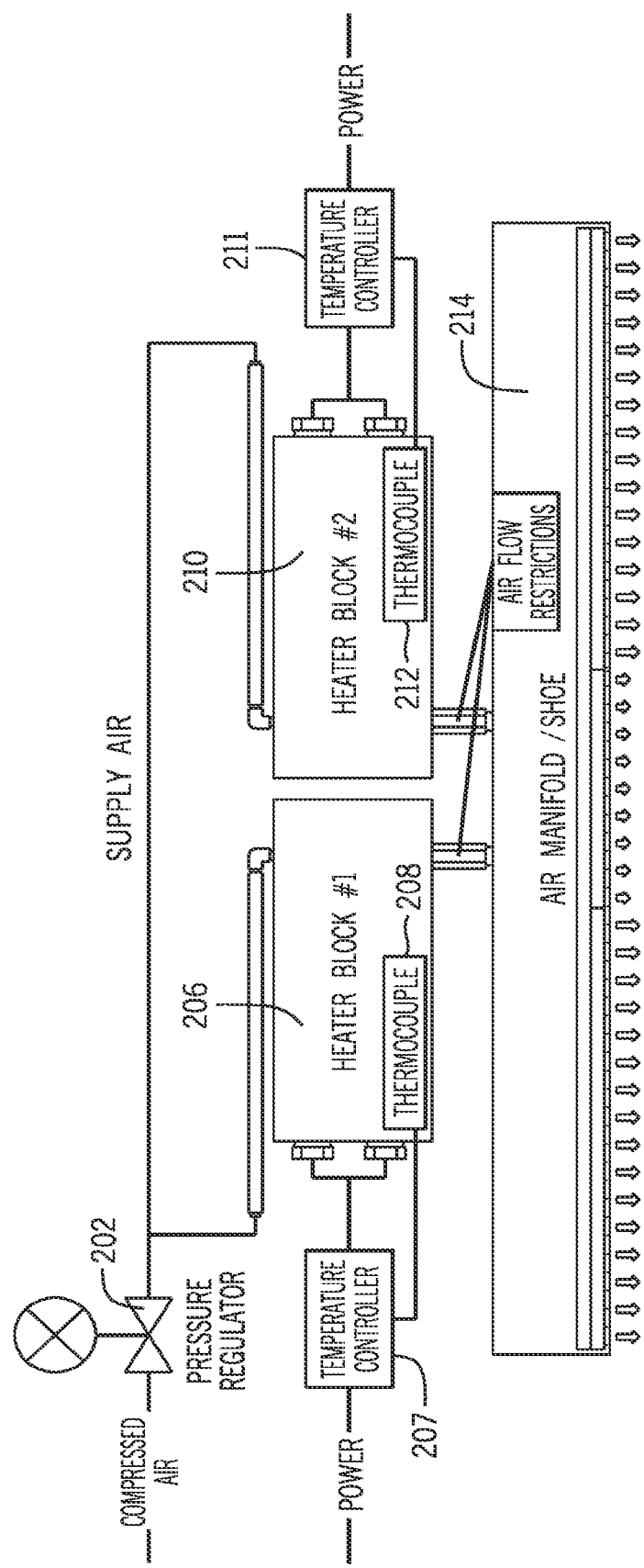
FIG. 2 is a diagram of a seal bar and related components.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION

While the present disclosure will be illustrated with reference to a rotary drum bag machine, and making bags using a rotary drum, it should be understood at the outset that the seal bar described herein can also be implemented with other types of bag machines.

Generally, the operation of rotary bag machines may be consistent with the prior art, except for the design of and operation of the seal bar and related components. Thus, this disclosure will be made with reference to the prior art bag machine of FIG. 1. However, seals bars 209 (and related components), along with controller 207, 211 are replaced as described below.

The temperature of air from the manifold (or shoe) is more directly a function of the manifold temperature, rather than the temperature of the heater block. Yet, prior art systems only use feedback of heater block temperature in their control loop. This disclosure provides for using the temperature of or near the manifold (or of air in or near the manifold). Also, in the prior art heat loss from the manifold is significant and effects the temperature of the air in the manifold. This increases heat up time, wastes energy, and results in a more difficult control. This disclosure provides, in an alternative, for reducing heat loss by insulating components, which reduces heat up time, reduces energy waste, and results in an easier control.

The preferred embodiment provides that the sealing section includes a sealer having a heater block and a manifold. An air flow path is provided so that air may be provided to the manifold by the heater block. The air is heated in the heater block. The heating of the air in the heater block is controlled by a controller. A temperature sensor is disposed in the air path and/or the manifold. A feedback circuit preferably is connected to the temperature sensor and to the controller, and the feedback sensor provides a signal indicative of temperature near the sensor to the controller so that the controller can control the air temperature. This allows the temperature of the manifold or of air in or near the manifold to be controlled to the desired temperature.

The temperature sensor is a thermocouple in the preferred embodiment but is a different type of sensor in other embodiments. A second temperature sensor is located in the heater block and provides a signal indicative of the temperature near the second sensor to the controller. The second sensor is used as a failsafe or runaway sensor. Thus, if for some reason the block overheats (for example a bad sensor in the manifold or a leak before the manifold), the failsafe sensor prevents overheating of the block.

In the preferred embodiment the sealing section includes rotary drum 208 which is disposed along the film path such that the film travels around a portion of the rotary drum. The seal bars on drum 208 each include a temperature sensor, and each is fed by a separate heater block in the preferred embodiment. The heater blocks and/or manifolds are insulated in the preferred embodiment, and not insulated in alternative embodiments. The sealer is a hem sealer, and/or a pocket sealer and/or a bottom sealer in various embodiment.

The preferred embodiment restricts air flow in the center of the manifold, so that relatively more air is directed to either end of the manifold in the preferred embodiment. The preferred embodiment provides that greater air flow at the ends than in the middle of the seal bars results in more consistent seals.

In operation bags are formed by directing the film to the input section and then directing the film from the input section to the sealing section. Air is heated in the heating block (or blocks) for each seal bar. The heated air is directed to the manifold of each seal bar. The temperature of the manifold, or heated air in the manifold, or the heated air as it is being directed to the manifold, is measured. The heating of air in the heating blocks is controlled in response to the measured temperature. Seals are formed using the seal bar manifolds. Alternatives provide for one or more of the seal bars to be those of the prior art, rather than as described herein The film is provided to the output section after the sealer.

Figure 3:
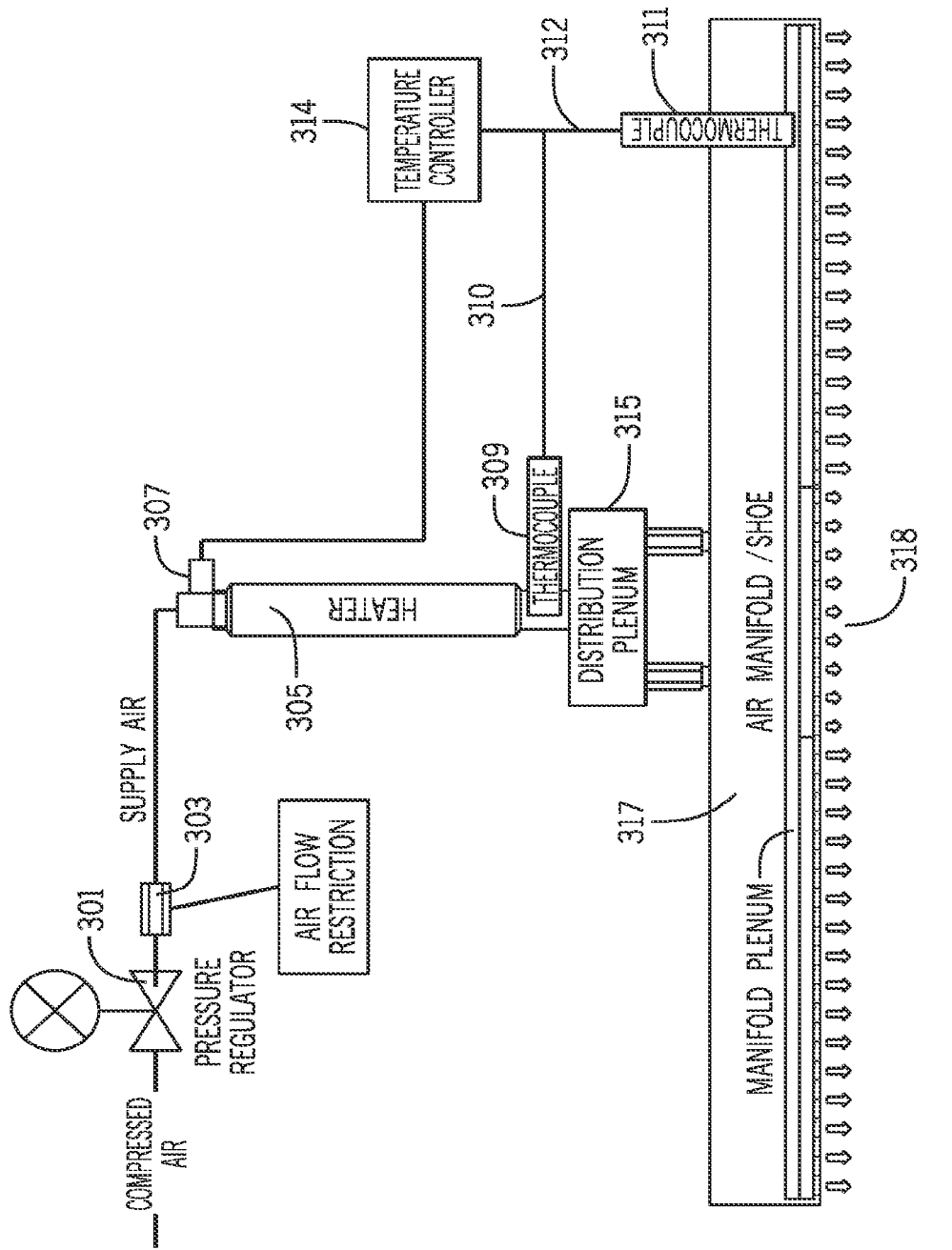
FIG. 3 is a diagram of a seal bar and related components.

Referring to FIG. 3, a seal bar that is a hem sealer, related components and a controller is shown. Alternatives provide that the sealer is a pocket sealer or a bottom sealer. A source of compressed air provides air through a pressure regulator 301 and an air flow restriction 303 to a heater block 305. A controller 307, 314 controls the heating of air in heater 305 in response to a set point and feedback. The setpoint is preferably user set, but can be fixed. Heater block 305 is a Cool Touch™ Flow Torch™ in the preferred embodiment.

Heated air is provided by heater block 305 to a distribution plenum 315. Air flows from plenum 315 to manifold 317. A thermocouple 311 in manifold 317 provides feedback on line 312 to controller 314, 307. Because thermocouple 311 is located in manifold 317 controller 314, 307 can more accurately control the temperature of manifold 317. Thermocouple 311 can be embedded in manifold 317 where it senses the temperature of manifold 317, or it can be in an open area of manifold 317 where it senses the temperature of the air in manifold 317. Alternatives provide for thermocouple 311 to be located in plenum 315, or in the air flow path from plenum 315 to manifold 317.

A second thermocouple 309 is located in heater block 305 and provides a signal on feedback line 310 to controller 314, 307. Thermocouple 309 and is used to prevent runaway heating (overheating) of heater block 305. Thus, controller 314, 307 has two feedback loops, each with a set point—one for manifold 318 and one for heater block 305. Controller 314, 317 "ANDS" the control so that heating is provided when both feedback loops indicate heating is needed. The heater block control loop prevents runaway temperatures. Thermocouple 309 can be embedded in heater block 305 where it senses the temperature of heater block 305, or it can be in an open area of heater block 305 where it senses the temperature of the air in heater block 305. Alternatives provide for thermocouple 309 to be located in an air flow path between heater block 305 and plenum 315, in plenum 315, or for it to be omitted.

Heater block 305, distribution plenum 315 and manifold 317 are insulated in the embodiment of FIG. 3. The insulation can be a simple insulation jacket or some other wrap, or can be internal to the components. Various alternatives omit the insulation from one or more of heater block 305, distribution plenum 315 and manifold 317.

The embodiment of FIG. 3 provides uneven heating of the film. Specifically, less air flow is provided in the middle portion of the seal bar (relative to the end portions), as indicated by smaller air flow arrows 318. Alternatives provide for other air flow patterns.

The typical start up time of prior art systems is about 40 minutes. It takes this long to heat the system to the desired temperature because of heat loss. Also, because the prior art systems control using heater block temperature, the heater reaches the set point before the manifold temperature is at the desired level Thus, prior art systems turn the heater off even though the temperature at the manifold is not as hot as desired.

Figure 6:
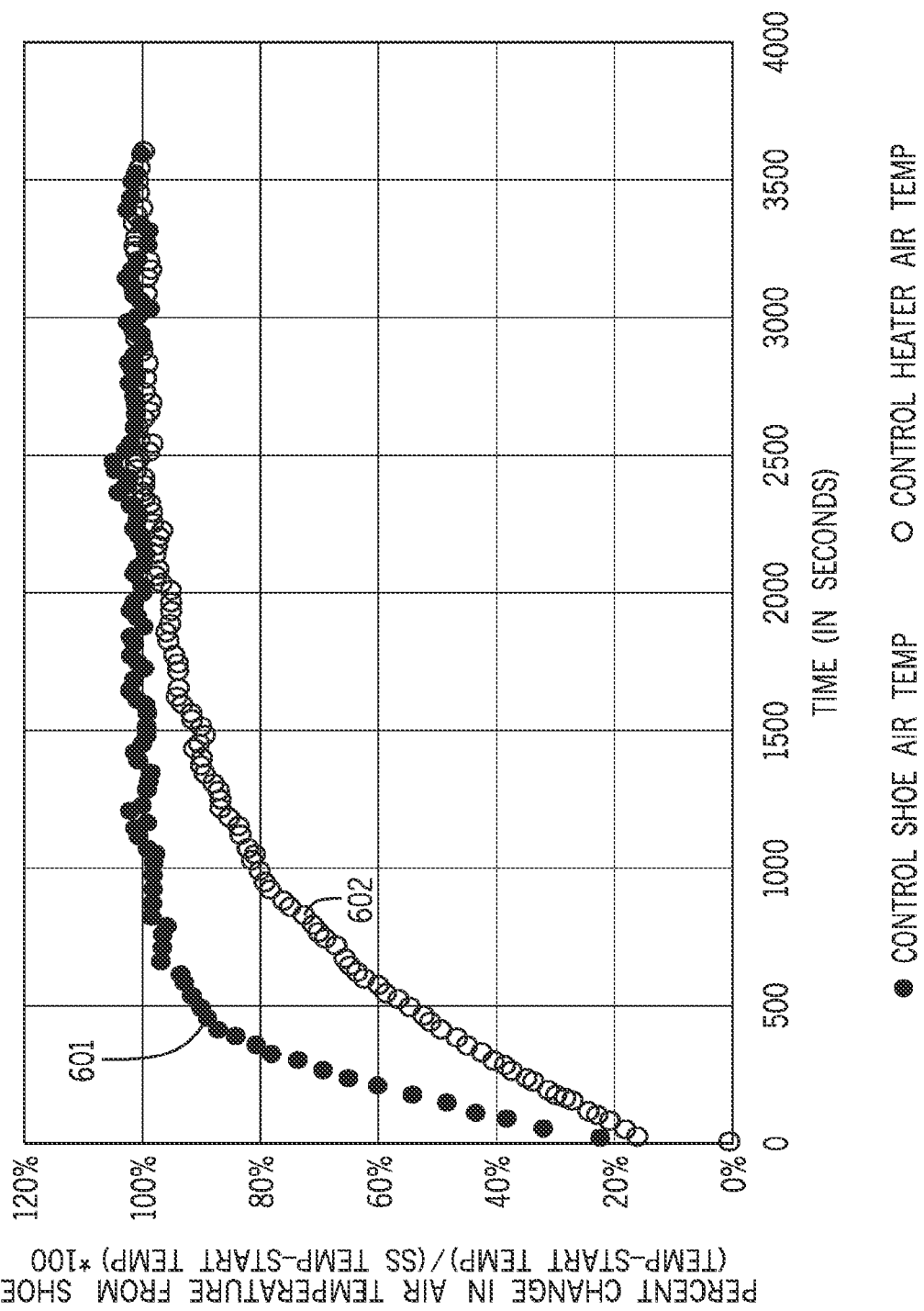
FIG. 6 is a temperature graph.

Using the embodiment of FIG. 3 provides a much faster start-up time. FIG. 6 is a graph of measured temperatures of the air delivered to the film at start up using the embodiment of FIG. 3 (line 601) and the prior art (line 602). It can be seen that the embodiment of FIG. 3 reaches almost 100% of the desired temperature in 500 seconds, and reaches the desired temperature in 1000 seconds, while the prior art takes about 1800 seconds to almost reach the desired temperature, and takes 2400 seconds to reach the desired temperature. This means that the prior art is not able to consistently produce seals for the first 40 minute of operation, while the embodiment of FIG. 3 will be able to consistently produce seals in just 10 minutes.

Figure 4:
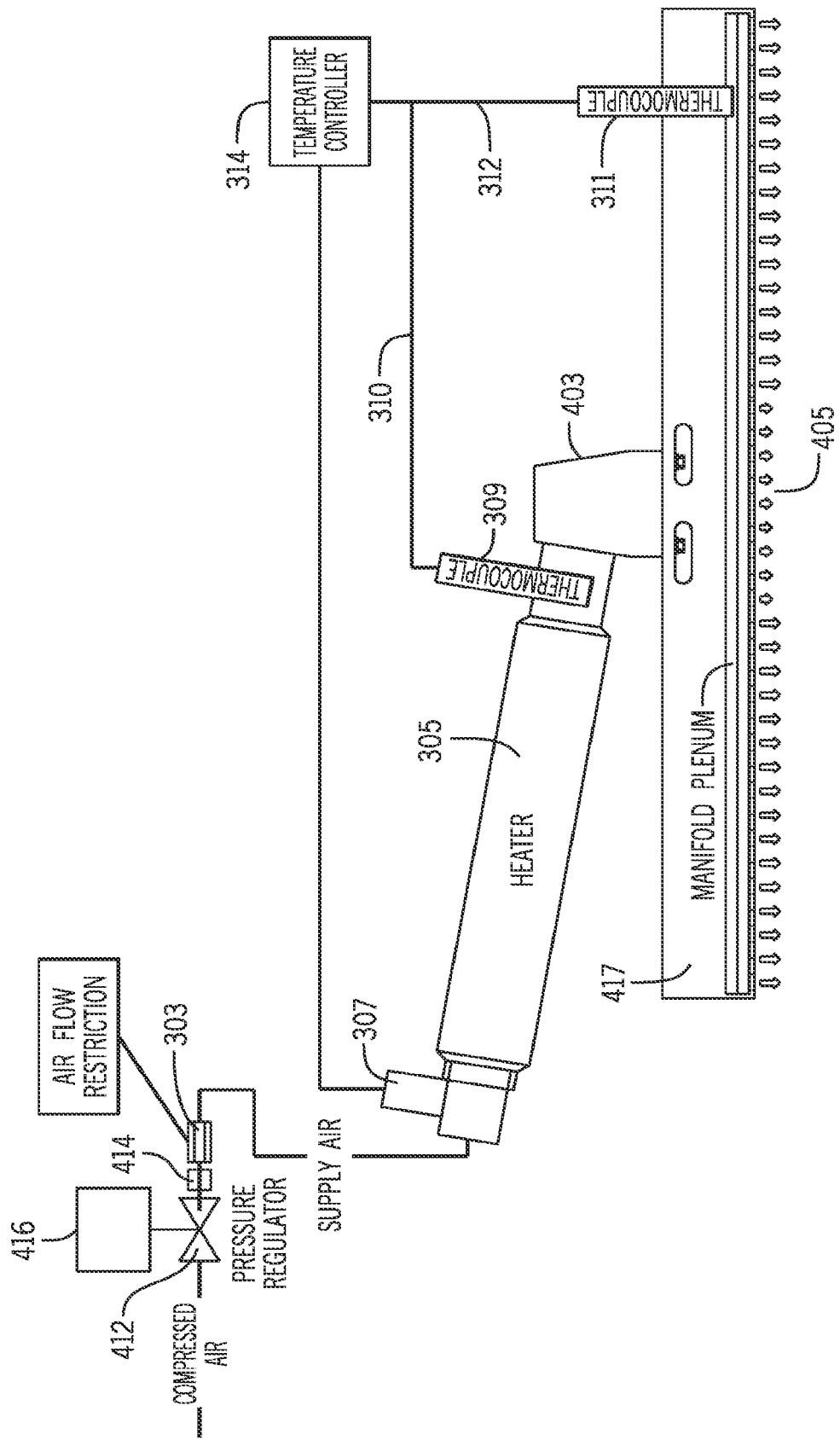
FIG. 4 is a diagram of a seal bar and related components.

Referring to FIG. 4 another embodiment of the seal bar and related components and the controller is shown. The sealer of FIG. 4 is a pocket sealer in the preferred embodiment, and is a hem sealer or bottom sealer in alternative embodiments. Some of the components of FIG. 4 may be the same as the embodiment of FIG. 3. The source of compressed air provides air through an air supply path that includes a controllable pressure valve 412, an air flow or pressure sensor 414, and air flow restriction 303 to heater block 305. A controller 416 controls pressure valve 412 in response to feedback from air flow sensor 414 to provide air flow at a set point. Controller 414 preferably uses a PID control loop. When air flow sensed by air flow sensor 414 is less than a set point, valve 412 is controlled to allow greater air flow, and when the sensed flow is greater than the set point valve 412 is controlled to allow less air flow. The desired flow is set by the user, factory, or process control in various embodiments. When set by the process, temperature feedback can be used to set the air flow set point. Any embodiment can be used with pressure sensor 414 and controllable valve 412, and/or with pressure regulator 301. In one alternative the source of compressed air provides air through pressure regulator 301 and air flow restriction 303 to heater block 305. In the embodiment of FIG. 4 heater block 305 is disposed in a different orientation relative to a distribution plenum 403. The layout of components and design of plenum 403 provides for improved air distribution which reduces heat loss. Controller 307, 314 controls the heating of air in heater 305.

Heated air is provided by heater block 305 to distribution plenum 403. Air flows from plenum 403 to a manifold 417. Thermocouple 311 is in manifold 417 and provides feedback on line 312 to controller 314, 307. Because thermocouple 311 is located in manifold 417 controller 314, 307 can more accurately control the temperature in manifold 417. Thermocouple 311 can be embedded in manifold 417 where it senses the temperature of manifold 417, or it can be in an open area of manifold 417 where it senses the temperature of the air in manifold 417. Alternatives provide for thermocouple 311 to be located in plenum 403, or in the air flow path from plenum 403 to manifold 417.

A second thermocouple 309 is located in heater block 305 and provides a signal on feedback line 310 to controller 314, 307. Thermocouple 309 and is used to prevent runaway heating (overheating) of heater block 305. Thus, controller 314, 307 has two feedback loops, each with a set point—one for manifold 317 and one for heater block 305. Controller 314, 317 "ANDS" the control so that heating is provided when both feedback loops indicate heating is needed. The heater block control loop prevents runaway temperatures. Alternatives provide for thermocouple 309 to be located in an air flow path between heater block 305 and plenum 403, in plenum 403, or for it to be omitted.

Heater block 305, distribution plenum 403 and manifold 417 are insulated in the embodiment of FIG. 4. The insulation can be a simple insulation jacket or some other wrap, or can be internal to the components. Various alternatives omit the insulation from one or more of heater block 305, distribution plenum 403 and manifold 417.

The embodiment of FIG. 4 provides even heating of the film. Specifically, substantially the same air flow is provided in the middle portion of the seal bar (relative to the end portions), as indicated by air flow arrows 405. Substantially the same air flow, as used herein, refers to air flow that forms seals in an even manner. This even air flow provides better flow from manifold 417 and is accomplished using plenum 403 and removing restrictions in the center of manifold 417, or providing restrictions away from the center of manifold 417 as needed. Alternatives provide for other air flow patterns.

Figure 5:
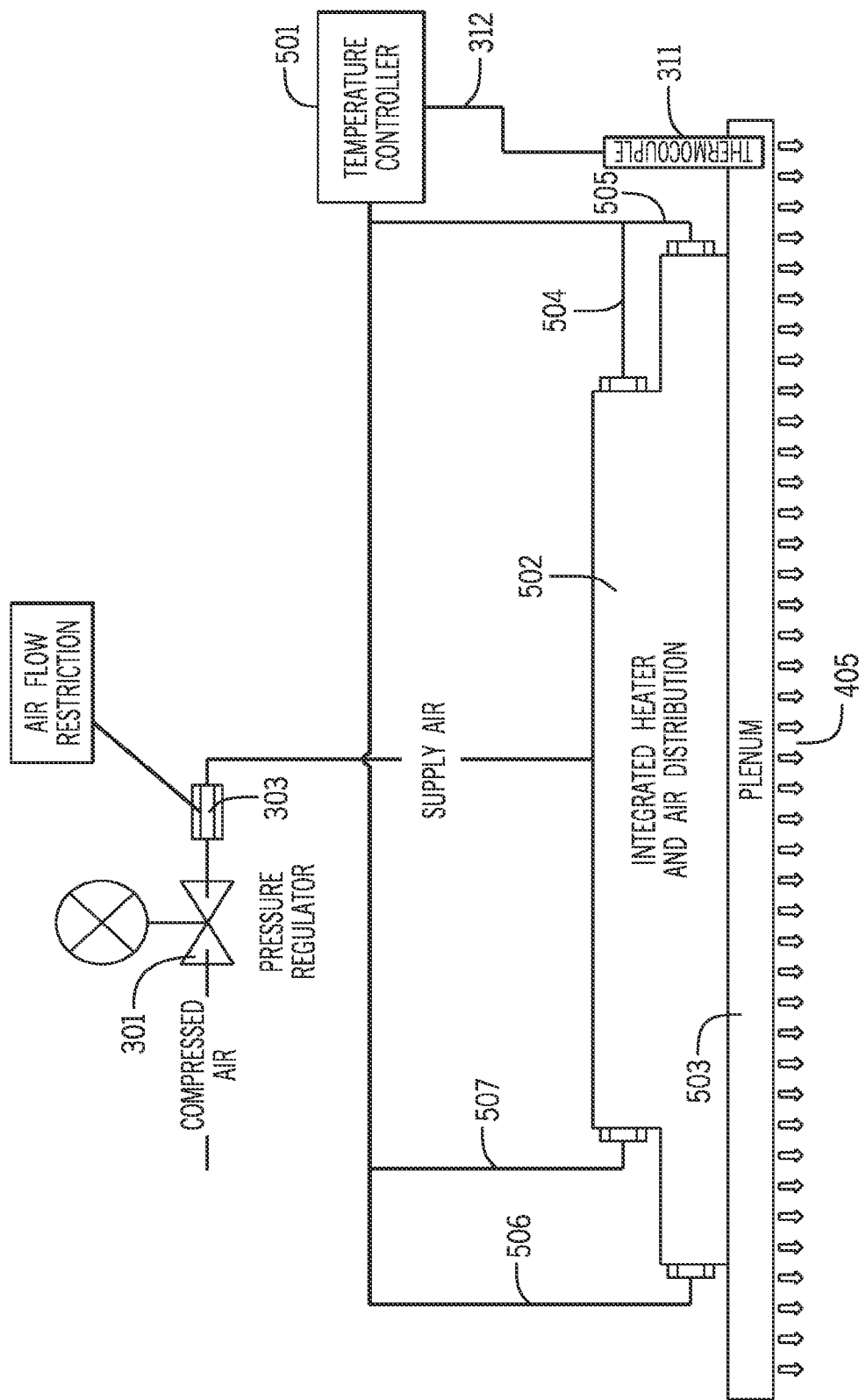
FIG. 5 is a diagram of a seal bar and related components.

Referring to FIG. 5 another embodiment of the seal bar and related components and the controller is shown. The sealer of FIG. 5 is a bottom sealer in the preferred embodiment, and is a hem sealer or pocket sealer in alternative embodiments. Some of the components of FIG. 5 may be the same as the embodiment of FIG. 3. The source of compressed air provides air through pressure regulator 301 and air flow restriction 303 to an integrated heater and air distributor 502. Heater and air distributor 502 is controlled by a controller 501 via lines 504-507.

Heated air is provided by integrated heater and air distributor 502 to a plenum 503, which serves the purpose of the manifold in other embodiments. Using the arrangement of FIG. 5 provides for improved air flow. Air flows from plenum 503 to the film, as indicated by arrows 405. Thermocouple 311 in plenum 503 provides feedback on line 312 to controller 314, 307. Because thermocouple 311 is located in plenum 503 controller 501 can more accurately control the temperature of air delivered to the film. Thermocouple 311 can be embedded in plenum 503 where it senses the temperature of plenum 503, or it can be in an open area of plenum 503 where it senses the temperature of the air in plenum 503. Alternatives provide for thermocouple 311 to be located elsewhere in plenum 503, or in the air flow path to plenum 503.

A second thermocouple can be used as in other embodiments to prevent runaway heating (overheating) of integrated heater and air distributor 502. The embodiment of FIG. 5 provides even heating of the film. Specifically, the same air flow is provided in the middle portion of the seal bar (relative to the end portions), as indicated by air flow arrows 405. This even air flow is accomplished using plenum 503 without air flow restriction, or by providing restrictions away from the center as needed. Alternatives provide for other air flow patterns.

Numerous modifications may be made to the present disclosure which still full within the intended scope hereof Thus, it should be apparent that there has been provided a method and apparatus for making bags that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that full within the spirit and broad scope of the appended claims.

What is claimed is:

1. A sealing section of a bag machine that forms bags from a film, the sealing section comprising:
    a heater block configured to heat air and dispense heated air along an air flow path;
    a manifold configured to receive the heated air from the air flow path and further dispense the heated air to thereby form seals in the film;
    a first temperature sensor configured to sense temperature of the heated air in the air flow path, temperature of the heated air in the manifold, or temperature of the manifold and further generate temperature signals;
    a second temperature sensor configured to sense temperature at the heater block and generate temperature signals; and
    a controller, in communication with the heater block, the first temperature sensor, and the second temperature sensor, that controls the heater block to heat the air when the controller determines that heating is needed based on the temperature signals from the first temperature sensor and the temperature signals from the second temperature sensor relative to one or more set points.

2. The sealing section according to claim 1, wherein the first temperature sensor is disposed in the air flow path or the manifold.

3. The sealing section according to claim 1, wherein the first temperature sensor is embedded in the manifold.

4. The sealing section according to claim 1, wherein the first temperature sensor and the second temperature sensor are thermocouples.

5. The sealing section according to claim 1, wherein the controller controls the heater block based on the temperature signals from the first temperature sensor and the second temperature sensor relative to the one or more set points to thereby prevent overheating of the heater block.

6. The sealing section according to claim 1, further comprising an air flow restriction upstream of the heater block to thereby promote even flow of the air downstream therefrom.

7. The sealing section according to claim 6, wherein the manifold is configured to evenly dispense the heated air therefrom.

8. The sealing section according to claim 6, wherein the sealing station is devoid of air flow restrictions downstream from the heater block.

9. The sealing section according to claim 6, further comprising a pressure regulator upstream of the heater block and configured to regulate the air.

10. A method for forming bags, the method comprising:
receiving a film into a sealing section of a bag forming machine;
receiving air into a heater block;
heating the air in the heater block;
conveying the heated air through an air flow path to a manifold;
dispensing the heated air from the manifold to thereby form seals in the film such that the bags are at least partially formed;
sensing, with a first temperature sensor, temperature of the heated air in the air flow path, temperature of the heated air in the manifold, or temperature of the manifold;
generating, with the first temperature sensor, temperature signals;
sensing, with a second temperature sensor, temperature at the heater block;
generating, with the second temperature sensor, temperature signals;
controlling, with a controller, the heater block to heat the air when the controller determines that heating is needed based on the temperature signals received from the first temperature sensor and the temperature signals from the second temperature sensor relative to one or more set points; and
dispensing the bags from the sealing section.

11. The method according to claim 10, wherein the first temperature sensor is disposed in the air flow path or the manifold.

12. The method according to claim 10, wherein the first temperature sensor is a thermocouple.

13. The method according to claim 10, further comprising restricting, with an air flow restriction positioned upstream of the heater block, the air to thereby promote even flow of the air downstream therefrom.

14. The method according to claim 10, wherein the air evenly dispenses from the manifold.

15. The method according to claim 10, further comprising receiving the air into a pressure regulator that regulates the air.

* * * * *